Nov. 24, 1931.  P. POLDERMAN  1,833,589
TURNING DEVICE FOR TURNING OFF SHAFTS, CRANK SHAFTS,
AND OTHER MACHINE PARTS ON THE SPOT
Filed Oct. 28, 1929
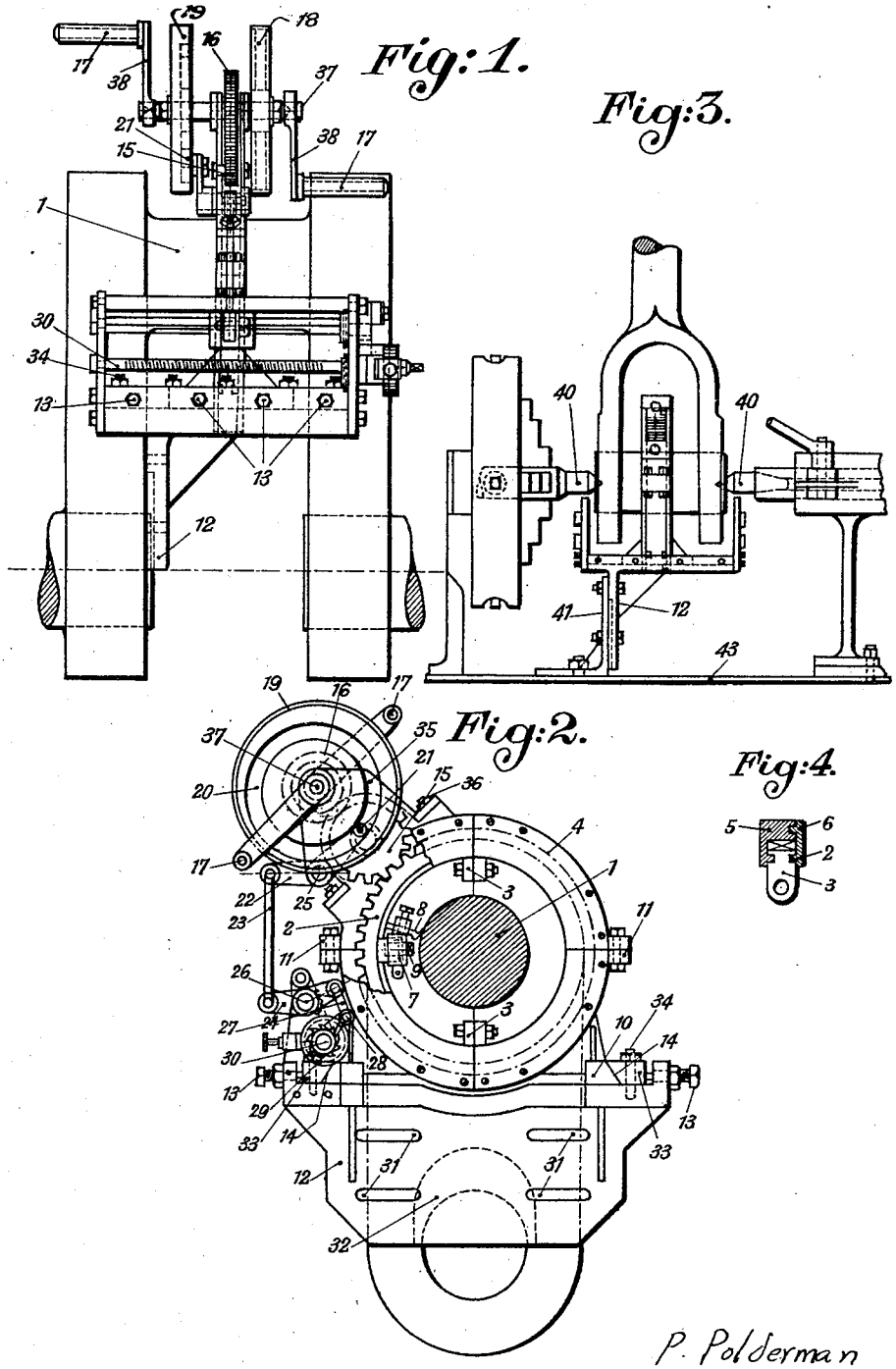

Patented Nov. 24, 1931

1,833,589

UNITED STATES PATENT OFFICE

PIETER POLDERMAN, OF IJMUIDEN, NETHERLANDS, ASSIGNOR OF ONE-HALF TO GERARDUS FREDERICUS BENIEST, OF IJMUIDEN, NETHERLANDS

TURNING DEVICE FOR TURNING OFF SHAFTS, CRANK SHAFTS, AND OTHER MACHINE PARTS ON THE SPOT

Application filed October 28, 1929, Serial No. 403,033, and in the Netherlands March 5, 1928.

My invention relates to a portable turning device for turning off shafts, crank shafts and other machine parts on the spot by means of a chaser mounted in a ring shaped member adapted to be rotated about its central axis.

The known devices of this type for turning off shafts, crank shafts and other like machine parts have the disadvantage that the ring shaped member is guided and adjusted by adjustable guides bearing upon the wasted and therefore unround shaft itself. By this reason all irregularities of the shaft to be worked will be transferred into the cut of the chaser. It is therefor that these devices are of no use and such wasted shafts and crank shafts are worked again by a hand file.

According to the invention this disadvantage is removed by a ring shaped gear carrying the toolholder bearing upon a base easily to be adjusted in a direction perpendicular to the axis of the piece of work, which base is adjustable in the length direction of the piece of work along a support, adapted to be mounted to a machine part making part of the piece of work or fixed to the piece of work and which support carries also means for adjusting the base lengthwise together with the ring shaped toothgear and the toolholder.

Reference is to be had to the accompanying drawings forming part of this specification in which similar characters of reference indicate corresponding parts in all the figures.

Fig. 1 represents a front view of a device according to the invention applied to a crank shaft.

Fig. 2 a side partially sectional view of the device shown in Fig. 1.

Fig. 3 a front view of a device applied to turning off the shaft of a forked end of a connecting rod and Fig. 4 a sectional view of the ringshaped housing and the ring shaped toothgear.

In the Figures 1 and 2 of the drawings the crank shaft to be turned off is indicated with 1. The turning device consists in a toothed ring 2, consisting in two halves, being joined to each other by flanges 3 and bolts. The toothed ring 2 is rotatably supported in a ring shaped housing or casing 4, consisting in two parts 5 and 6 (Fig. 4) engaging with a circular tooth and groove. Between these parts, as shown in Fig. 4, a space is left in order to contain the toothed ring 2, whilst at the underside an open slit is provided in the housing through which the flanges 3 of the toothed ring and the toolholder 7 pass and which slit permits these parts to be moved when the toothed ring 2 rotates. In the toolholder 7 a chaser 8 is clamped, which chaser may be adjusted by a bolt 9 with square head.

The housing 4 consists in a lower half bearing upon a base 10 and two upper quadrants, the latter being connected to the lower half by flanges 11 and bolts. The base 10 is slidably supported in a support 12 by means of adjustable length guides 33 and bolts 13 and 14. For this purpose the base 10 and the guides 33 possess beveled faces at 14. The bolts 34 pass through cross slots (not shown) of the guides. By releasing the bolts 14 and actuating the screws 13 the guides 14 and simultaneously the base 10 with the housing 4 may be adjusted in a direction perpendicular to the length axis of the work piece.

The toothed ring 2 meshes with a toothed gear 15 upon a shaft 37, supported by a frame 35 fixed to the housing 4 by bolts 36. The toothed gear 15 may be rotated by two cranks 38 with handles 17 mounted upon the same shaft 37. Upon the shaft 37 are also keyed a flywheel pully 18 for driving the mechanism by a belt from a motor and a cam disc 19. In the surface of this cam disc a cam slot 20 is provided actuating a pawl 28 by means of a roller 21, a lever 22 pivoting about an axis 25, a rod 23, a lever 24, pivoting about an axis 26 and a lever 27, the said pawl engaging a ratchet wheel 29 keyed upon a leading screw 30 (Fig. 1 and 2). This leading screw 30 is rotatably supported in a nut of the housing 4 and therefore when actuating the leading screw the housing with the toothed ring and the toolholder is moved in the length direction of the said screw. The leading screw 30 is provided with a square head, in order to be able to adjust the chaser by hand.

The support 12 is provided with oblong slots 31 through which bolts pass, in order to fix the support to the body of the crank. The support 12 is also provided with an oblong aperture 23 in order to adjust the support surrounding the extending end of the crank shaft.

In Fig. 3 of the drawings the same device is shown applied to turn off the shaft or pin of a forked connecting rod. The shaft is clamped between two centers 40, the latter being supported by two frames bearing upon a baseplate 43. The support 12 is fixed upon a rectangular base 41 also screwed to the base plate 43.

In order to apply the device the upper quadrants of the housing 4 must be removed from the lower part and the two halves of the toothed ring must be released and placed surrounding the shaft to be turned off. Then the different parts are joined together. Then the housing is adjusted approximately central with respect to the axis of the shaft by means of the bolts passing through the slots 31 of the support 12. Now the turning mechanism is centred more exactly by means of the adjusting screws 13, the guides 33 and the bolts 34. Then the tool is adjusted and actuated by the handles 17. By means of the cam slot 20 in the surface of the cam disc 19 the pawl 28 gets a swinging motion and rotates when moving forwardly the ratchet wheel 29 over one tooth. In this way the chaser is moved lengthwise.

As the toothed ring is adjusted and actuated independently of the shaft to be turned off, the same is finished exactly cylindrically.

What I claim is:

1. A portable turning device including a base, a housing carried by said base adapted to be adjusted with respect to the work piece to be turned off, a rotatable two-part toothed ring supported in said housing, a chaser fixed to said ring, a support movably mounting the base, means for adjusting the base on the support in a direction perpendicular to the axis of the work piece, and means for moving the base, housing, ring and chaser on the support in the direction of the axis of the work piece.

2. A device as claimed in claim 1, characterized in that the means for adjusting the base perpendicularly to the axis of a work piece includes guide members having a portion thereof under-cut and coacting with the base, and means for adjusting said guide members.

3. A device as claimed in claim 1, characterized in that said housing includes a plurality of segmental members coupled together and open at the inside to accommodate movement of the chaser.

4. A device as claimed in claim 1, characterized in that the means for moving the housing in the direction of the axis of a work piece includes a feed screw coacting with the housing and means for imparting step by step movement to the feed screw during rotation of the toothed ring and chaser.

5. A device as claimed in claim 1, characterized by the provision of manually operable means coacting with the toothed ring to effect rotation thereof, said manually operable means being coupled with the means for moving the housing in the direction of the axis of a work piece.

In testimony whereof I have signed my name to this specification.

PIETER POLDERMAN.